(12) United States Patent
Sullivan et al.

(10) Patent No.: US 6,651,216 B1
(45) Date of Patent: Nov. 18, 2003

(54) EFFICIENTLY NAVIGATING A WORKBOOK LINKED TO A DATABASE

(76) Inventors: Dave Sullivan, 1755 NW. Arthur Cir., Corvallis, OR (US) 97330; Matthew Garth McLuckie, 4018 NW. Witham Hill Dr., Apt. #50, Corvallis, OR (US) 97330

( * ) Notice: Subject to any disclaimer, the term of this patent is extended or adjusted under 35 U.S.C. 154(b) by 0 days.

(21) Appl. No.: 09/309,402

(22) Filed: May 10, 1999

(51) Int. Cl.[7] .............................................. G06F 17/21
(52) U.S. Cl. ....................................... 715/503; 715/526
(58) Field of Search ................................ 707/503–509, 707/511, 526, 528–529, 530, 531, 538, 102, 104.1; 715/503, 504, 505, 506, 507, 508, 509, 511, 526, 528, 529, 530, 531, 538

(56) References Cited

U.S. PATENT DOCUMENTS

| | | | |
|---|---|---|---|
| 5,150,458 A | * 9/1992 | Masuzaki et al. ............ | 345/636 |
| 5,188,562 A | * 2/1993 | Carley ......................... | 462/54 |
| 5,253,361 A | * 10/1993 | Thurman et al. .............. | 707/3 |
| 5,301,319 A | * 4/1994 | Thurman et al. ........ | 707/103 R |
| 5,312,478 A | * 5/1994 | Reed et al. ................. | 707/503 |
| 5,317,686 A | * 5/1994 | Salas et al. ................. | 707/503 |
| 5,325,478 A | * 6/1994 | Shelton et al. .............. | 707/507 |
| 5,371,675 A | * 12/1994 | Greif et al. ................. | 707/503 |
| 5,590,259 A | 12/1996 | Anderson et al. | |
| 5,598,519 A | * 1/1997 | Narayanan ................... | 707/504 |
| 5,784,545 A | 7/1998 | Anderson et al. | |
| 5,806,078 A | * 9/1998 | Hug et al. ................... | 707/511 |
| 5,819,293 A | 10/1998 | Comer et al. | |
| 5,819,300 A | * 10/1998 | Kohno et al. ................ | 707/511 |
| 5,864,869 A | * 1/1999 | Doak et al. .............. | 707/104.1 |
| 5,918,238 A | * 6/1999 | Hayashi ....................... | 707/526 |
| 5,926,818 A | * 7/1999 | Malloy ........................ | 707/100 |
| 5,943,668 A | * 8/1999 | Malloy et al. ................. | 707/3 |
| 6,070,177 A | * 5/2000 | Kao et al. .................... | 707/500 |
| 6,134,563 A | * 10/2000 | Clancey et al. ............. | 707/503 |
| 6,138,130 A | * 10/2000 | Adler et al. ................. | 707/503 |
| 6,185,582 B1 | * 2/2001 | Zellweger et al. .......... | 707/503 |
| 6,205,447 B1 | * 3/2001 | Malloy ........................ | 707/102 |
| 6,292,811 B1 | * 9/2001 | Clancey et al. ............. | 707/503 |
| 6,334,141 B1 | * 12/2001 | Varma et al. ................ | 709/205 |
| 6,349,315 B1 | * 2/2002 | Sonoyama et al. ......... | 707/528 |

OTHER PUBLICATIONS

Tim O'Brien, Pogge, & White, Microsoft Access 97 Developer's Handbook, Microsoft Press, 1997, pp. 478–483.
Eric Wells, Steve Harshbarger, Microsoft Excel 97 Developer's Handbook, Microsoft Press 1997, pp. 356–393.

* cited by examiner

*Primary Examiner*—Stephen S. Hong (57) ABSTRACT

A way to navigate efficiently among worksheets in a workbook linked to a database that involves double-clicking on a cell in a page showing totals and having the detail page associated with cell be displayed.

2 Claims, 9 Drawing Sheets

Class Totals Page

| | | | Assignment | | | | | | Exam | | |
|---|---|---|---|---|---|---|---|---|---|---|---|
| Points Possible | | 900.00 | 100.00 | 100.00 | 100.00 | 100.00 | 100.00 | 100.00 | 100.00 | 100.00 | 100.00 |
| Weighting Factor | | 0.11 | 0.20 | 0.30 | 0.00 | 0.00 | 0.00 | 0.00 | 0.50 | 0.00 | 0.00 |
| Weighted Points Possible | | 100.00 | 20.00 | 30.00 | 0.00 | 0.00 | 0.00 | 0.00 | 50.00 | 0.00 | 0.00 |
| Category | | | Assignment | | | | | | Exam | | |
| Activity Names | Grade | Total | Treasure Hunt | Presentation | CRC1 | CRC2 | CRC3 | CRC4 | Prereq. Exam | Midterm | Final Exam |
| Jeremy Fergus | F | 47.00 | 17.00 | 24.00 | | | | | 6.00 | | |
| Frans Finch | F | 40.00 | 10.00 | 30.00 | | | | | | | |
| Daniel Gaston | B | 80.00 | 20.00 | 21.00 | | | | | 39.00 | | |
| Matthew Higgins | D+ | 65.30 | 15.80 | 27.00 | | | | | 22.50 | | |
| Jeremy Johnson | B+ | 86.50 | 18.00 | 24.00 | | | | | 44.50 | | |
| Brandon Kline | C- | 68.00 | 19.00 | 0.00 | | | | | 49.00 | | |
| Tim Kopecki | A- | 89.50 | 16.00 | 30.00 | | | | | 43.50 | | |
| Brandy Madson | B | 82.50 | 19.00 | 30.00 | | | | | 33.50 | | |
| Charles Meyaka | A- | 89.10 | 18.60 | 27.00 | | | | | 43.50 | | |
| Leah Morhland | B+ | 85.30 | 13.80 | 27.00 | | | | | 44.50 | | |
| Jacob Percell | F | 14.10 | 9.60 | 0.00 | | | | | 4.50 | | |
| Lee Prust | D+ | 64.00 | 19.00 | 0.00 | | | | | 45.00 | | |
| Andrew Robson | A | 91.00 | 19.00 | 27.00 | | | | | 45.00 | | |
| Kelly Steffens | F | 45.00 | 18.00 | 27.00 | | | | | | | |
| Sarah Strausbaugh | F | 54.50 | 16.00 | 0.00 | | | | | 38.50 | | |
| Christopher Texteria | B- | 77.50 | 14.00 | 30.00 | | | | | 33.50 | | |
| Charles Tjandra | A- | 88.50 | 16.00 | 30.00 | | | | | 42.50 | | |
| Michael Vantress | A | 98.50 | 19.00 | 30.00 | | | | | 49.50 | | |
| Inge Walsh | A | 94.00 | 19.00 | 30.00 | | | | | 45.00 | | |
| Jerod Wolf | B+ | 84.00 | 18.00 | 27.00 | | | | | 39.00 | | |

Figure 5

College Office, BA 201-001 - Activities

File Edit View Insert Tools Publish Access Macros Window Help

R1C7 =

Activities Page

| Activity Number | Title | Due Date | Category | Activity Web Addr |
|---|---|---|---|---|
| 1 | Treasure Hunt | 10/5/99 | Assignment | http://www.bu |
| 1.1 | Content | | | |
| 1.2 | Graphics | | | |
| 1.3 | Comments | | | |
| 2 | Presentation | 10/14/99 | Assignment | http://www.bu |
| 2.1 | Slide 1 | | | |
| 2.2 | Slide 2 | | | |
| 2.3 | Slide 3 | | | |
| 2.4 | Slide 4 | | | |
| 2.5 | Slide 5 | | | |
| 2.6 | Comments | | | |
| 3 | CRC1 | 10/30/99 | Assignment | http://www.bu |
| 3.1 | Query1 | | | |
| 3.2 | Query2 | | | |
| 3.3 | Query3 | | | |
| 3.4 | Query4 | | | |
| 3.5 | Comments | | | |
| 4 | CRC2 | 11/5/99 | Assignment | http://www.bu |
| 4.1 | | | | |
| 5 | CRC3 | 11/16/99 | Assignment | http://www.bu |
| 5.1 | | | | |
| 6 | CRC4 | 11/30/33 | Assignment | http://www.bu |
| 6.1 | | | | |
| 7 | Prereq. Exam | 10/5/99 | Exam | http://www.bu |
| 7.1 | | | | |
| 8 | Midterm | 11/5/99 | Exam | http://www.bu |

Class Totals / Class Properties / 1/2/3/4/5/6/7/8/9 \ Activities / Student I

Ready

Figure 6

Activity 1, Treasure Hunt          83

| Points Possible | | 100.00 | | 100.00 | |
|---|---|---|---|---|---|
| Weighting Factor | | 0.20 | | 0.20 | |
| Weighted Points Possible | | 20.00 | | 20.00 | |
| | | | | | |
| Category | | | | Assignment | |
| Activity Names | Grade | Total | Content | Graphics | Comments |
| Jeremy Fergus | OK | 17.00 | 50.00 | 35.00 | Excellent research work |
| Frans Finch | Poor | 10.00 | 25.00 | 25.00 | Some of your facts need checking |
| Daniel Gaston | Well Done | 20.00 | 50.00 | 50.00 | Excellent research work |
| Matthew Higgins | OK | 15.80 | 34.00 | 45.00 | Some of your facts need checking |
| Jeremy Johnson | Well Done | 18.00 | 45.00 | 45.00 | Plausible research overall |
| Brandon Kline | Well Done | 19.00 | 50.00 | 45.00 | Excellent research work |
| Tim Kopecki | OK | 16.00 | 35.00 | 45.00 | Plausible research overall |
| Brandy Madson | Well Done | 19.00 | 50.00 | 45.00 | Excellent research work |
| Charles Meyaka | Well Done | 18.60 | 48.00 | 45.00 | Excellent research work |
| Leah Morhland | OK | 13.80 | 24.00 | 45.00 | Some of your facts need checking |
| Jacob Percell | Poor | 9.60 | 3.00 | 45.00 | Some of your facts need checking |
| Lee Prust | Well Done | 19.00 | 50.00 | 45.00 | Excellent research work |
| Andrew Robson | Well Done | 19.00 | 50.00 | 45.00 | Excellent research work |
| Kelly Steffens | Well Done | 18.00 | 45.00 | 45.00 | Plausible research overall |
| Sarah Strausbaugh | OK | 16.00 | 35.00 | 45.00 | Plausible research overall |
| Christopher Texteria | OK | 14.00 | 25.00 | 45.00 | Some of your facts need checking |
| Charles Tjandra | OK | 16.00 | 35.00 | 45.00 | Plausible research overall |
| Michael Vantress | Well Done | 19.00 | 50.00 | 45.00 | Excellent research work |
| Inge Walsh | Well Done | 19.00 | 50.00 | 45.00 | Excellent research work |
| Jerod Wolfe | Well Done | 18.00 | 45.00 | 45.00 | Plausible research overall |

Activities

| Activity Number | Title | Due Date |
|---|---|---|
| 1 | 10-15 | |
| 1.1 | Score | |
| 2 | 10-18 | |
| 2.1 | Score | |

Figure 8A

Class Totals Page

| Activity Numbers | Grade | Total | Activity 1 | Activity 2 |
|---|---|---|---|---|
| Activity Names | Grade | Total | 10-15 | 10-18 |

Figure 8B

Activity 1, 10-15

| Activity Numbers | Grade | Total | 1.1 |
|---|---|---|---|
| Activity Names | Grade | Total | Score |

EFFICIENTLY NAVIGATING A WORKBOOK LINKED TO A DATABASE

REFERENCE TO CD-ROM APPENDIX

Part of this patent disclosure is the source code used in Suvan College Office 2000 (hereinafter referred to as College Office), a grade-book program that was being distributed by Microsoft Corporation of Redmond, Washington and Suvan LLC of Corvallis, Oregon at the time that this patent application was filed. The applicants transferred the source code to a compact disk which is attached as Appendix A. It contains only one file named: CollegeOfficeSource-Code—ASCII.txt. This file is 663 kilobytes in size and was created on Apr. 13, 2003. It contains an exact copy of the material originally filed on paper as an attachment to the patent application.

BACKGROUND-FIELD OF INVENTION

This invention relates to user interface design in spreadsheet programs that link with database systems.

BACKGROUND OF THE INVENTION

A spreadsheet program is a computer application program commonly used for recording and analyzing data, budgeting, forecasting, and many other tasks that involve calculating results. In a spreadsheet program, data and formulas are entered in ledger-like forms (herein called worksheets) for analysis, tracking, planning, or "what-if" evaluations. Each worksheet uses rows and columns of cells; each cell can hold text or numeric data or a formula that uses values in other cells to calculate a desired result. Most spreadsheet programs label each worksheet's columns with letters (A, B, C, and so on); and rows are given numbers (1, 2, 3, and so on). Because real-world problems tend to have more than two dimensions, modern spreadsheet programs organize worksheets into a workbook, which is a collection of named worksheets. Most often the names of a workbook's worksheets appear on page tabs that are visible along the workbook's bottom edge. Thus, a particular cell in a workbook might be named Student Information!D7, where the exclamation point serves as a delimiter between the worksheet name and the column/row designator.

Spreadsheet programs are among the most widely used computer programs because they let people to build numerical models quickly and easily. It only takes a few minutes to enter labels and formulas to build a simple budget model. For similar ease-of-use reasons, many—if not most—instructors enter scores about their students' performance into a grading worksheet that assigns one row to each student and has a total column to calculate how many points were earned by each student in the class overall.

The row-and-column ledger-like format of a spreadsheet program provides an understandable way to view and interact with data. This has led people to explore the construction of larger and larger spreadsheet models that make extensive use of workbook pages. For example, if we return to the example of using a spreadsheet to record scores and calculate grades, an instructor's workbook might have a Class Totals page to summarize information on various Activity pages, where each Activity page has detailed scores and comments for one assignment or exam in the class.

While workbooks with many pages of data are fairly easy to construct, maintaining the integrity of the data that they contain can be a major problem. For example, assume an instructor with 20 students builds a workbook with a Class Totals page and nine Activity pages (similar to Class Totals and Treasure Hunt pages shown in FIGS. 5 and 7). If the instructor sorts the rows on the Class Totals page (perhaps to list students in descending order based on their performance on the Treasure Hunt activity), then formulas that link cells between the Class Totals page and the Activity pages will get jumbled—unless all nine Activity pages are also sorted in an identical manner. This could cause a formula for one student on the Class Totals page to retrieve data about another student from an Activity page—resulting in incorrect values appearing on the Class Totals page. Similar problems can occur if the instructor deletes a row on the Class Totals page (perhaps because a student withdrew from the class) or adds a new row to the Class Totals page—unless extreme care is taken to make sure corresponding changes are made to all related pages in the workbook.

A database system (database) is a set of computer programs used to store and retrieve data. Such data is often limited to text (letters, numerals, symbols, and other characters), but may include any data that may be stored by a computer. Most databases store data in tables. A table is a series of rows, also called records. Each row contains data about a particular thing, such as a merchandise order. The rows are divided into columns, and the intersection of a row and column is referred to as a field.

A database can store many tables and can store relationships among tables indicating how the tables are logically related to each other. It can use these relationships to make sure all data remains well organized as new rows are created, existing rows are deleted, or data is sorted or otherwise manipulated. For example, a database for storing student information might have tables for Students, Classes, Classlists, Courses, Activities, Subactivities, and Scores similar to FIG. 3.

Figure 3:
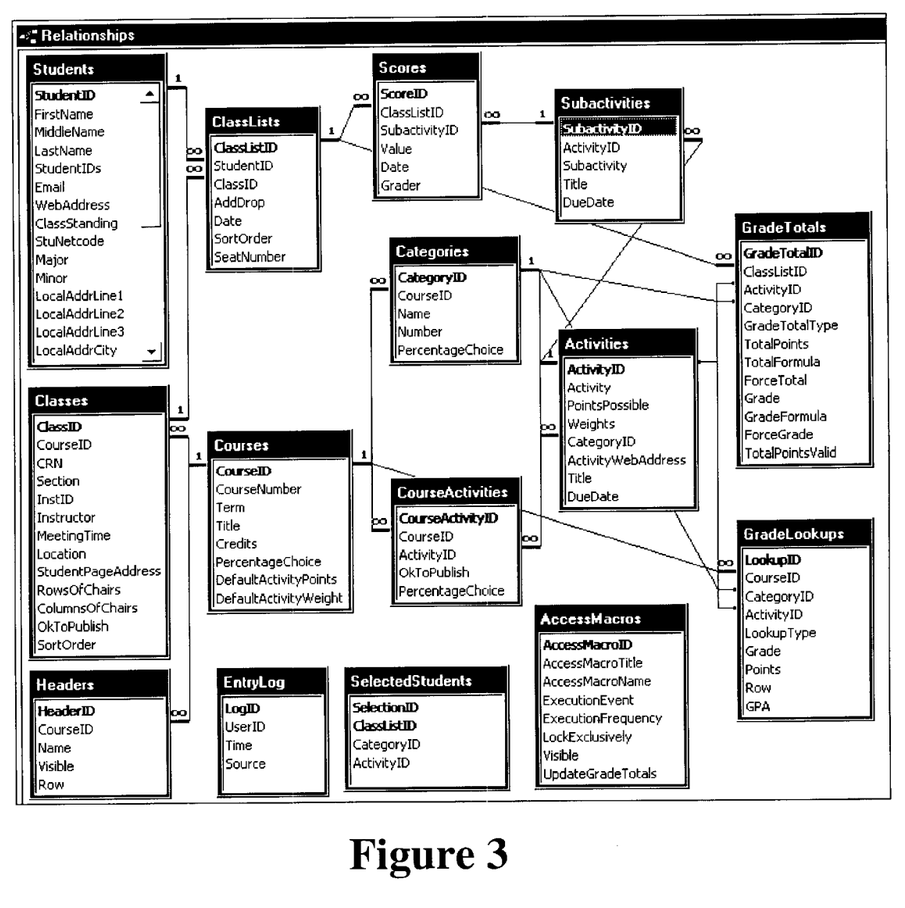
FIG. 3 is a relationship diagram showing the table names, primary keys, field names, and relationships in a database.

In FIG. 3, the Students table is linked to the Classlist table with a one-to-many relationship based on the StudentID fields of both tables. This means each row in the Students table could be logically related to multiple rows in the Classlist table (another way of saying this is "one student could be enrolled in several classes"). Because this relationship exists independent of the order of records in the Students and Classlist tables, sorting the Classlist table without sorting the Students table will not result in jumbled or incorrect data about which students are enrolled in which classes. Thus, because tables can be linked with predefined relationships, a database can automatically maintain the integrity of data among the tables when requests are made to sort, add, or delete records. This represents an important advantage of using database techniques to organize data in comparison with the usual methods for storing data in multiple pages of a workbook.

In comparison with a spreadsheet program, most people find a database system hard to use. While a computer scientist might find the relationships in FIG. 3 understandable, the typical instructor would not know how to contend with such an abstract representation of data. This has led software developers to search for ways to link a spreadsheet program to a database in an attempt to combine the spreadsheet's ease-of-use and understandability with the database's power and data integrity.

Perhaps the most difficult aspect of linking a spreadsheet with a database has been the fact that a database can store MANY tables with different kinds of data, and collectively these tables often have more dimensions than will easily fit in a workbook's three-dimensional row, column, and page format. What has been needed is a method of linking a workbook to a database that retains as much of the database's richness and relationships as possible while making the process of imposing these relationships inside a workbook absolutely transparent-so that the computer user doesn't need to know anything about database structure to use the linked workbook.

SUMMARY

As the inventors, we devised a way to link a workbook so that it retrieves data from, calculates totals, and posts data back to a database. The method hides the complexity associated with a traditional database management system from the computer user while allowing the user to tap into the workbook's ability to accept formulas and calculate custom results.

The invention uses a Totals page as a table of contents to organize a variable number of Detail pages inside a workbook whose cells are linked to fields in a database. The Totals page might also be called a summary page or a contents page because its job is to organize and provide access to all Detail pages. A feature is to let the user give a single command to add or delete a row from all relevant pages of the workbook, with each row being logically linked to an item in the database, such as a student in a class, tree in a test plot, or customer in a sales region. Henceforth in this patent disclosure, these rows will be referred to as Item rows. The present invention includes several other methods to facilitate the transparent linking of a workbook with a database.

Collectively these features transform the workbook into an easy-to-use interface for editing, summarizing, and analyzing the richness of well-organized information that can exist in a multi-table database. Making all these things happen transparently from the computer user's viewpoint is not easy from the software developer's viewpoint—at least with the technology available today. For this reason this patent disclosure contains detailed instructions about the method's operation including complete source code instructions written in Visual Basic for Applications (hereinafter referred to as VBA) (see Appendix A, a compact disk).

BRIEF DESCRIPTION OF THE DRAWINGS

In the drawings, related figures have the same number but different alphabetic suffixes.

FIG. 7 shows an Activity page from a College Office grade-book.

Reference Numerals in Drawings 2 computer
3 display
8 keyboard
9 diskette drive
12 CD-ROM drive
20 database system
28 spreadsheet program
29 operating system
46 title bar
47 menu bar
50 items rows
51 page tabs
54 toolbars
55 total values
56 detail columns
57 lookup values
58 header rows
59 forced entry
60 dual-purpose area, Total page
61 item rows area, Total page
62 workbook totals area, Totals page
63 header rows area, Totals page
64 footer rows area, Totals page
65 lookup values area, Totals page
69 categories, Totals page
81 item rows area, Detail page
82 area for showing totals of subdetail columns
83 header rows area, Detail page
84 area with subdetail columns, Details page
85 lookup values area, Detail page

DESCRIPTION

Preferred Embodiment

Glossary of terms

College Office (defined below) is a preferred embodiment of the invention. Before attempting to explain how College Office operates, it seems appropriate to include a glossary that defines the terms used inside College Office and in this patent disclosure.

Activity—Any assignment, exam, or other graded task within a course.

Activity page—Whenever the user asks to insert a new activity, College Office creates an Activity page in the gradebook that the user can use to record scores or comments (see FIG. 7). Since data about an activity is stored in the Activities database table, and rows in this table are linked to courses, if the user creates an activity for one class within a course, College Office will add that activity to all other classes within the course.

Category—In College Office, a category is a group of activities. For example, the user might create two categories, Homework and Exams, in order to separate activities into two logical groups. Categories are handy because they make similar items appear as a group in the gradebook. This grouping also makes it easier to write custom formulas that will perform tricks like dropping the lowest score from the assignment category.

Class—A specific class or section within a course. For example, a course such as CS101 can have many classes, such as CS101-01, CS101-02, and so on.

Class Totals page—The first page in a College Office grade-book. The Class Totals page acts like a table of contents to summarize all scores entered on activity pages. It also calculates overall course grades for students.

College Office—A grade-book program that lets an instructor enter scores, calculate grades, and print results. It uses a Microsoft Excel workbook to let an instructor enter scores and comments in a familiar manner. It stores all data in a Microsoft Access database. This backend database engine keeps all data well organized and generates the reports. From the typical user's viewpoint, the database remains completely hidden and everything appears as if it is stored in a well-formatted spreadsheet workbook. As of the date of filing this patent disclosure, Suvan College Office 2000 is being actively marketed by Suvan LLC of Corvallis, Oregon and also is being distributed by Microsoft Corporation of Redmond, Washington.

Custom formula—A forced entry that is a formula that a user has entered into the workbook. In the College Office implementation of this invention, both the formula and the value calculated by the formula are stored in the database.

Detail page—An Activity Page within College Office is an example of a Detail Page. Thus, a detail page is a workbook page that has values that are summarized in some manner on the workbook's Totals page.

Header row (58)—A row at the top of the Class Totals or activity pages that displays status information that applies to every student. Header rows remain frozen in place when the user scrolls student information up or down.

Item row (50)—A row that appears on the Totals and on all Detail pages in the workbook and contains information about a particular item from the database. In College Office, each item row displays information about one student in a class.

Microsoft® Access—A relational database program that organizes data in tables, extracts data with queries, and prints reports.

Microsoft® Excel—A spreadsheet application that can combine many worksheets into a workbook with many worksheet pages.

Suvan LLC—A limited liability company in Corvallis, Oregon lead by a team of three people who began working closely as instructors in the College of Business at Oregon State University. For more information about Suvan LLC, go to http://www.collegeoffice.com.

Subactivity—A named column in an Activity page in which the user can enter a score or comment.

Subdetail—A subdetail is a named column on a Detail page in which the user can enter data. Within College Office a subdetail column is called a subactivity column.

Totals page—The generic equivalent of the Class Totals page in College Office. In other implementations of the invention, the Totals page would not necessarily be the first or leftmost page in the workbook.

Total value (55)—A value on the Totals page that adds or otherwise summarizes values in the detail columns (56).

VBA—Visual Basic for Applications, the programming language used to store College Office instructions and logic.

Workbook—For the purpose of this patent disclosure, a workbook is defined as a plurality of worksheets wherein each worksheet cell can be identified by a three-dimensional cell address referring to a specific row, column, and page in the workbook.

Overview of Processing

Figure 1:
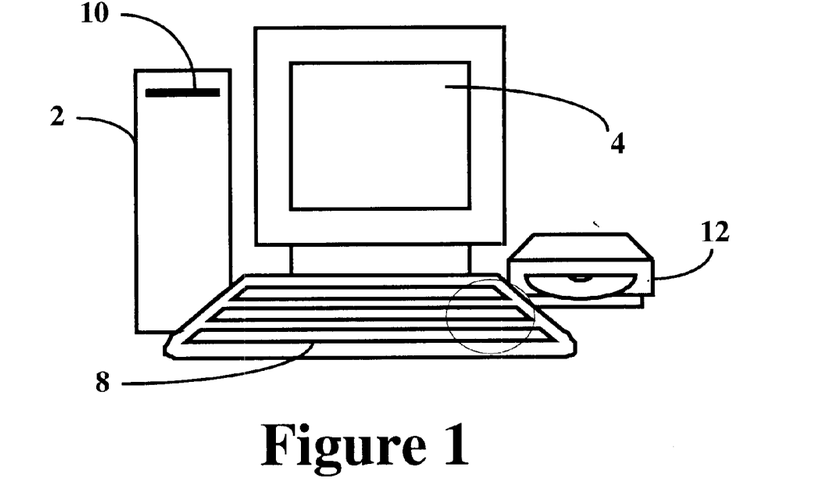
FIG. 1 is a diagrammatic representation of a computer used in conjunction with the preferred embodiment of the invention.

As shown in FIG. 1, the present invention may be embodied in a conventional desktop IBM-compatible computer 2 that contains a processor, short-term memory (RAM), and long-term storage such as a hard disk. The computer may also have a screen display or monitor 4, keyboard 8, CD-ROM drive 12, and floppy disk drive 10. Additional input and output devices, such as a mouse, trackball, or printer may be included in the system. The computer under software control moves information among the input and output devices, such as accepting commands from the keyboard, causing images to appear on the monitor, or printing reports on the printer.

Figure 2:
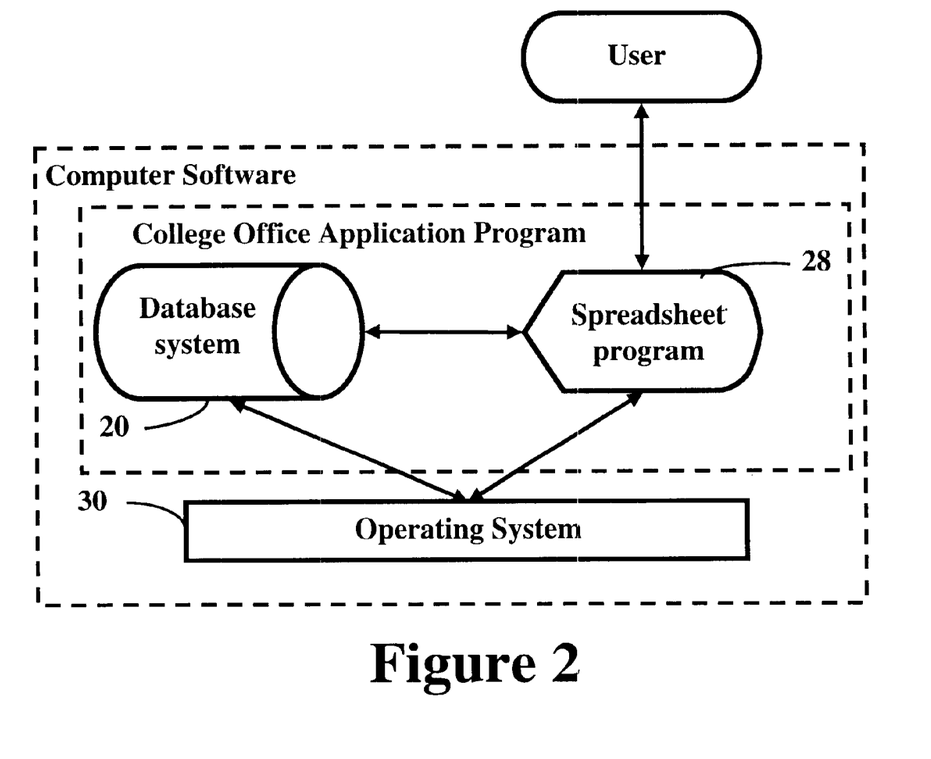
FIG. 2 is a block diagram showing one way that the software components in the invention could be related to each other.

FIG. 2 shows a functional block diagram of the software system provided for directing the operation of the computer. The computer user interacts primarily with the spreadsheet portion 28 of the software. Data passes back and forth between the spreadsheet's workbook and the database's tables. Both the spreadsheet 28 and database 20 rely on the operating system 30 to provide support for common operations, such as reading and writing to disk. In a preferred embodiment, the operating system is Microsoft Windows 95, Windows 98, or Windows NT, the spreadsheet is either Microsoft Excel 97 or Microsoft Excel 2000, and the database is either Microsoft Access 97 or Microsoft Access 2000.

Description of College Office

The software that contains a preferred embodiment of this invention is stored somewhere inside the dashed box labeled College Office Application Program in FIG. 2. At the time of filing this patent disclosure, this software was being distributed worldwide by Microsoft Corporation of Redmond, Washington and by Suvan LLC, and is described throughout the rest of this section. College Office stores nearly all its instructions as VBA statements in two workbooks named "College Office.xls" and "College Office 2000.xls." The instructions in both workbooks are essentially identical; the file that College Office chooses to use depends on whether the computer uses Microsoft Office 97 or Microsoft Office 2000; that is, "College Office.xls" is used if the computer uses Microsoft Office 97 and "College Office 2000.xls" is used if the computer uses Microsoft Office 2000. Because the inventors want to disclose how the invention works in as much detail as possible, the source code for these instructions is listed in a compact disk labeled as Appendix A.

Anyone who wants to understand the College Office source code should begin by examining the list of global variables at the beginning of the mSetRestoreEnvirorment module. This list defines the arrays used to contain values retrieved from the database, complete with comments about the internal structure of the arrays. It also defines the global program control flags used to pass information among modules.

Launching College Office

Returning to FIG. 1, in a preferred embodiment, the user launches College Office, perhaps by double-clicking on "College Office.xls" inside Windows Explorer, the file manager that ships with Microsoft Windows. This causes Microsoft Excel to launch and begin loading the "College Office.xls" workbook. Because this workbook contains VBA instructions, Microsoft Excel is likely to issue a warning about viruses and ask the user whether to continue loading the program.

Figure 9:
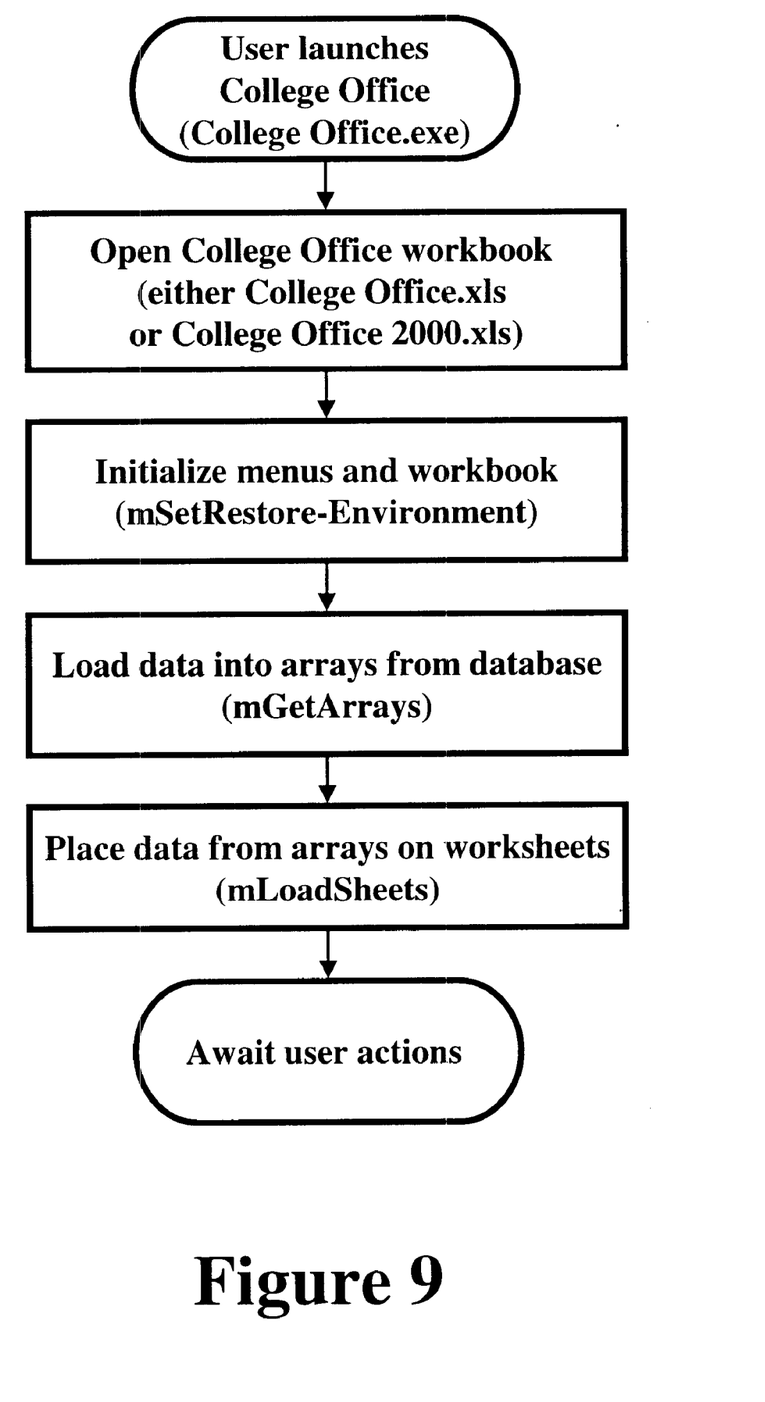
FIG. 9 shows a simplified flowchart of what happens when College Office is launched.

FIG. 21 shows a simplified flowchart of the events that occur when the user asks to launch College Office. Assuming the user asks to continue, Excel will fire a Workbook_Open event that passes control to the College Office VBA instructions. Once College Office has control, it begins executing the instructions inside the SetEnvironment subroutine in the mSetRestoreEnvironment module.

An early processing step is to check the computer's registry to determine the location of the database file and create a connection to the database. Because College Office is designed to work with either Microsoft Access 97 or Microsoft Access 2000, and these two versions of Access use different data file formats, College Office chooses whether to open a connection to "College Office.mdb" (for Microsoft Access 97) or "College Office 2000 .mdb" (for Microsoft Access 2000). Other early steps include modifying the pull-down menus, tool bars and other user interface settings to work appropriately for the College Office application.

Database Table Structure

In order to make the linkage between the database tables and the workbook transparent to the computer user, the College Office VBA instructions assume the database tables have a particular structure. To understand how College Office organizes data, study FIG. 3 carefully: it lists all tables and field names in the College Office database. It also shows how tables are logically related to each other. Each table stores data about one specific aspect of College Office. All tables use an autonumbered primary key to record the sequence in which entries are made. Here is an alphabetical list of what each table does.

AccessMacros Table—This table's purpose has little to do with this patent disclosure.

Activities Table—Each row contains the name, grading criteria, and other information about one activity. Because the Activities table is linked to Courses and not Classes, every class in a course has the same activities. Rows in the Activities table are logically similar to columns in the Class Totals workbook page.

Categories Table—Each row describes one category. Categories are useful for grouping activities together. For example, FIGS. 5 and 6 use Assignments and Exams categories.

Classes Table—Each row describes one class within a course. In addition, courses with more than one class will have a row for Class All, so instructors can see a combined listing of all students in the entire course.

Classlists Table—Each row represents one student in a specific class.

CourseActivities Table—Each row represents one activity in a specific course. If we were to redesign the database from scratch, this table would be combined with the Activities table because the two tables perform identical functions.

Courses Table—Each row lists data about a specific course.

EntryLog Table—This table's purpose has little to do with this patent disclosure.

GradeLookups Table—This table stores the grading criteria in all Set Grade Cutoff areas of the College Office gradebook. Each row in GradeLookups describes one row from a Set Grade Cutoffs area, and the LookupType field identifies whether the row belongs to an activity page, the Class Totals page, or the Class Properties page.

GradeTotals Table—Each row stores data about the Total and Grade columns for one student and one page in the gradebook. The GradeTotal-type field identifies whether the row belongs to an activity page or the Class Totals page. Anyone writing custom reports will want to extract TotalPoints and Grades from this table to include in the report.

Headers Table—Each row in this table identifies whether a header row is visible in a particular course. Thus, changing the values of this table's Visible and Row fields will cause header rows to become visible or hidden and will shift the visible ones up or down on the screen.

Scores Table—Each row contains one Value; that is, a score or comment, about a specific student's work. This table also includes information about who entered the value and when. Changing a cell's value while using College Office adds a new row to this table; it doesn't modify or remove any existing rows. This means College Office preserves a history about how each cell's value was initially entered and who entered any subsequent changes to the value.

SelectedStudents Table—This table allows Microsoft Excel to communicate with Microsoft Access about which students and activities should be included in a report. Whenever a print request is given, College Office places a row in this table for each student that should appear in the report. Rows in this table are deleted automatically once the report has been generated.

Students Table—Each row describes one student. The user can add or delete fields to this table, and College Office will adapt appropriately. For example, if the user deletes fields from the table, College Office will show fewer columns in the Student Information List page. The first few fields are required, so the user should not remove the FirstName, MiddleName, LastName, StudentIDs, or Email fields. Because College Office uses the StudentIDs field to identify one student from another, the StudentIDs must be unique.

Subactivities Table—Each row describes one column within an activity page.

Loading a Class into the Workbook

The following code from the end of the SetEnvinroment subroutine shows the critical order of events as College Office finishes loading. Relatively unimportant lines of code have been removed from this abbreviated listing to improve the code's clarity, and line numbers have been added to identify the remaining lines concisely.

Call GetAllArrays (bGetCurrentClass)
Call SetGradebookOpenMenu
Call SetPublishMenu
Call SetAccessMacrosMenu
Call SetInsertHeaderMenu
Call SplashUpdate ("Loading Gradebook Pages")
Call LoadEntireGradebook (1, bGetCurrentClass)
Call SplashUpdate ("Loading Class Totals")
Application.Caption="College Office, Course:"& aCurrentClass(0,
  & ", " & aCurrentClass (6, 0) & "; Class:" & sSection & ", Page"
Sheets ("Class Totals").Activate
Application.ScreenUpdating=True
Exit Sub The GetAllArrays subroutine in the mGetArrays module (and the subroutines that it calls) use SQL statements. to retrieve all data about the current class from the database into arrays in memory. This retrieves information from many tables: Courses, Classes, Classlists, Scores, Students, Activities, Subactivities, and so on. GetAllArrays calls on many other subroutines in the mGetArrays module. The mGetArrays module is used almost exclusively to retrieve data from the database. Definitions of what is stored in the arrays can be found at the beginning of the mSetRestoreEnvironment module.

One of the trickiest parts of building College Office came from the difficulty of finding processing methods that worked sufficiently fast: no one will use the invention if it requires waiting an inordinate length of time for data to appear on the screen or waiting many seconds for a value to be entered into the workbook and database. Some early methods that we tried took a minute or more to display data on a single workbook page. Fairly early in our experimentation, we found it is essential to minimize the number of times that the VBA code reaches out and retrieves data from the database. We also found it critical to minimize the number of times that data is placed on each worksheet. To meet these experimentally determined processing requirements, we decided to load all data needed by the workbook into arrays when College Office begins. This lets us manipulate and arrange data in memory without making further calls to the database. It also lets us pack all data to be placed on a specific worksheet into a special-purpose array that can be dropped onto the sheet with one command-a much faster process than placing items on the sheet one cell at a time. The difference in performance was so dramatic that we almost gave up on the project because it initially looked like our idea of linking a workbook to a database simply wouldn't run fast enough to be practical.

The SetGradebookOpenMenu subroutine creates the fly-out list of classes for the File—Open Class command. This fly-out menu is important because a relational database can hold many tables that are all logically linked with each other, and each table can hold millions of records. This means a database can store, organize, and update data structures that are significantly more complex than will fit into a workbook at once.

The SetPublishMenu subroutine determines what reports are contained in the Microsoft Access database that start with the characters "mnu" strips off these three leading characters from the report names, and adds the truncated report names to a pull-down menu available inside College Office.

The SetAccessMacrosMenu subroutine puts entries on the Access Macros pull-down menu inside College Office, and this College Office feature is not closely related to this patent disclosure.

The SetInsertHeaderMenu subroutine builds a fly-out menu for inserting header rows to College Office. Later, if the user gives a command from the Insert—Insert Header Row menu, College Office will add a new header row to all Activity pages and the Class Totals page of the workbook.

The calls to SplashUpdate display status messages on the screen to keep the user informed about what is happening while College Office loads data and prepares the workbook. Even with all the tricks and processing shortcuts that we have found, College Office takes a long time to load data from the database, and users find the wait easier to tolerate if they are kept informed about what is happening.

The LoadEntireGradebook subroutine manages the overall process of placing data in the workbook. When College Office loads the first time, all Activity pages need to be filled with data from the database because data on Activity pages builds upward to the Class Totals page, and formulas on any Activity page can affect values on the Class Totals page.

The code inside LoadEntireGradebook does not create new worksheets for each activity, instead it hides and unhides worksheets as necessary to build a workbook with the proper number of visible Activity pages. This technique turned out to be necessary because Microsoft Excel 97 does not reliably create or delete worksheets. Early prototypes of College Office bombed inexplicably in a rather nasty manner by locking up the computer and requiring a reboot. Eventually we traced the problem to statements that created or deleted worksheets, and later we encountered similar problems with creating charts. Just as with the performance issues described earlier, this problem was serious enough that we came close to abandoning the project. Like most Monday morning quarterbacking, the solution appears rather obvious in retrospect: create a workbook with many hidden pages and charts. That way, as more Activity pages are needed, the necessary worksheets with their embedded charts can be unhidden and linked logically to the database and the Class Totals page. Fortunately, Excel 97 is able to hide and unhide both worksheets and charts reliably. Thus, each College Office workbook starts off with 50 hidden activity pages, and this places an upper bound on how many activity pages can be added to each class. We expect future spreadsheet programs will allow us to relax this limitation, hopefully to allow an almost unlimited number of workbook pages.

To keep the user informed about what data is currently loaded into the workbook, we decided to label the workbook's title bar with a descriptive caption that displays the workbook's current course and class.

The last major step in loading College Office is to activate the Class Totals page. This presents the user with a view that summarizes all activity pages in the workbook, similar to FIG. 4 or FIG. 5.

By setting Application.ScreenUpdating to False while the workbook is being filled with data, the processing moves much more rapidly. This illustrates one of many processing tricks embedded in the College Office code that we needed to combine in order to build a working system that runs fast enough to be useful. After the workbook has been completely loaded, it is necessary to reset Application.ScreenUpdating to True so the user can see the finished Class Totals page.

The Exit Sub command brings College Office to a logical halt because it has finished loading data from the database and has presented the user with a fully loaded workbook.

The software described above configures a general-purpose computer system to load a workbook with data as described in claim 35.

Further processing must await actions by the user, such as a request to add new Detail pages to the workbook. These user actions fire Microsoft Excel events that are trapped by the College Office VBA code and invoke processing to implement the user's requests. The next section describes how to locate the specific segments of code that implement the user's requests. Said segments of code configure a general—purpose computer system to perform the user—requested actions described in claim 35.

Processing User—Generated Commands

Figure 10:
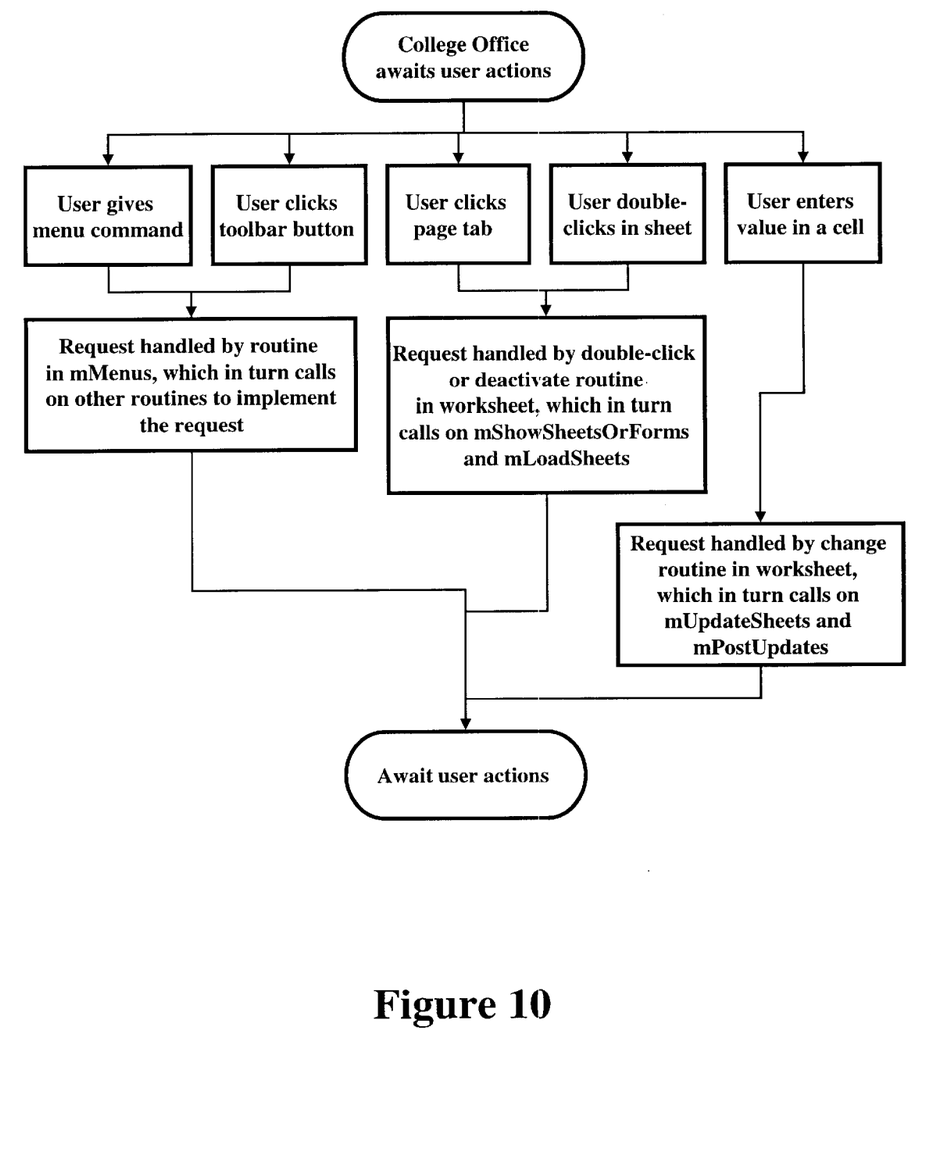
FIG. 10 shows a simplified flowchart of what happens when the user gives a command or enters a value.

So far we have described the College Office database structure and the overall processing logic that College Office uses to retrieve data from the database and load data into a workbook. The next logical set of ideas to describe is how the user gives commands and what College Office does with those commands. To understand this process, look at FIG. 10, which contains a simplified flowchart showing how College Office responds to various user actions.

Figure 4:
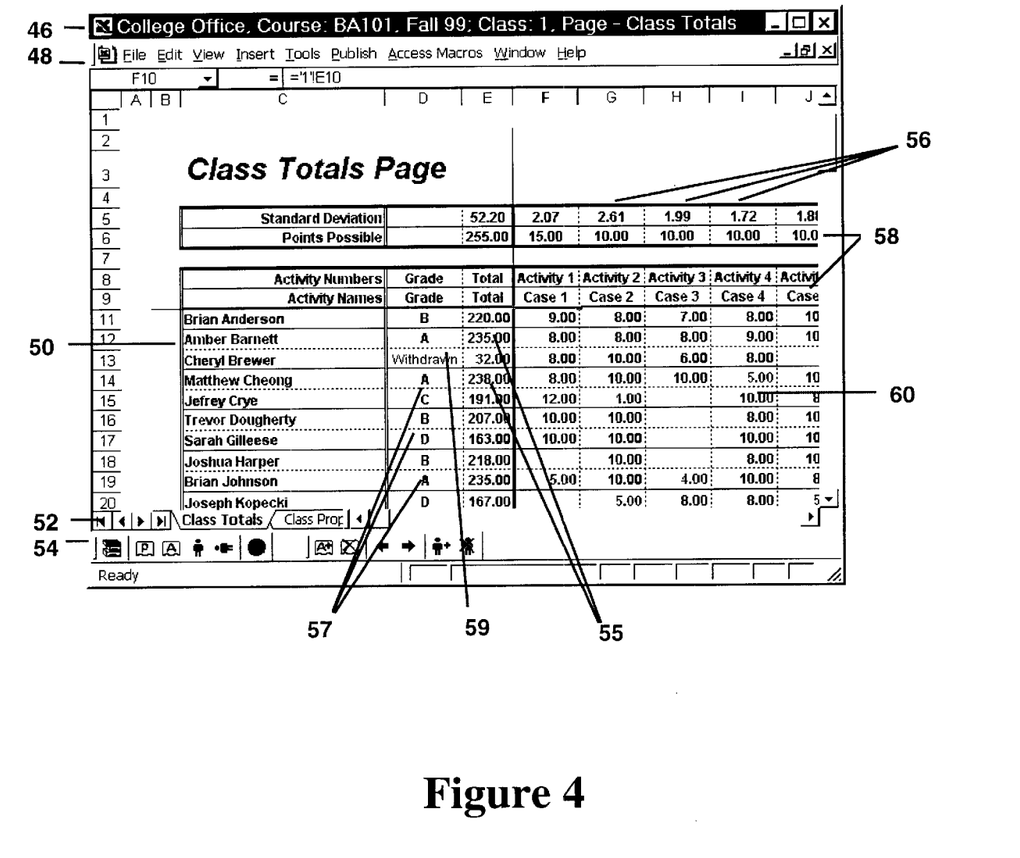
FIG. 4 shows how a specific implementation of the invention might look from the computer user's viewpoint while looking at the Totals page.

FIG. 4 shows the view a user might see after College Office has finished loading. At this point the user can give commands by:

Using the pull—down menus at the top of the screen or clicking with the right-mouse button and making a selection from the resulting fly-out menu. If the menu command is a normal Microsoft Excel command, then Excel handles the processing. If the command is a customized College Office command, then processing will first pass to a subroutine in the mMenus module. This module's purpose is to provide a subroutine for each command that the user can give, and these subroutines either do the work directly or call on other College Office subroutines to do the actual work. This makes it fairly straightforward to determine how any particular College Office feature is implemented. The first step is to determine how the user would invoke the command; then examine the menu command to determine which macro (subroutine) in the mMenus module handles that command; finally, step through the processing logic that the mMenus subroutine invokes when the command is given.

Clicking on toolbar choices at the bottom of the screen. To make College Office easier to use, we created custom toolbars at the bottom of the screen and gave each toolbar button a tool-tip help message. All these toolbar buttons are assigned to macros that can be found in the mMenus module, just like the menu. commands described in the last paragraph.

Double-clicking on various parts of the sheet to jump from one page to another. The fastest way to move from one location to another is to double-click on strategic places of each page. For example, the Class Totals page includes a Set Grade Cutoffs area that normally lies off the right edge of the screen. To view the Set Grade Cutoffs area, the user can double—click on the "Class Totals Page" label at the top of the screen shown in FIG. 4. This asks College Office to scroll the screen and make the Set Grade Cutoffs area visible. To jump back to upper—left corner of the Class Totals page, the user can double-click on the Set Grade Cutoffs label. When the user double-clicks on a worksheet, the resulting Worksheet_BeforeDoubleClick event is trapped by College Office, and the processing logic that College Office evokes can be found inside the worksheet's Worksheet_BeforeDoubleClick subroutine.

Clicking on page tabs generates a Worksheet_Deactivate event for the current worksheet and a Worksheet_Activate event for the worksheet requested by the user. Both events are trapped and cause processing to occur in College Office.

Entering values into cells. Entering value(s) into a worksheet generates a Worksheet_Change event that College Office traps. Processing these events is not convenient within the Worksheet objects because each Worksheet object would need similar code. To avoid this, each Worksheet object calls an appropriate subroutine within the mUpdateSheets module to handle the Worksheet_Change event. As an example, all worksheets for Activity pages use the following line:

Call UpdateGradebookPage(target, Me.name)

This line shifts processing for Change events to a common subroutine. Note that this call passes two arguments: target contains a reference to the area within the worksheet that has been changed, and Me.name passes the name of the worksheet that has been changed. Using this information, UpdateGradebookPage goes about the hard work of determining what cells had their values changed, locating where in the logical view of the sheet (see FIG. 5) these cells fell, and calling on the proper subroutines in the mPostUpdates module to write values back to the database. Then, depending on what values where changed, College Office may need to reload data into arrays from the database, and it may need to reload data onto worksheets from the arrays.

When we say that UpdateGradebookPage goes about the hard work of handling change events, we mean it. UpdateGradebookPage contains roughly 500 lines of carefully written, well commented code. We didn't write the comments, organize the indenting, and prepare this routine simply to have a nicely documented patent disclosure. Instead, we spent months writing, testing, and documenting this module and the mPostUpdates module that it calls upon because we couldn't figure out an easier way to link changes made to the workbook back to the database—and without clearly commenting and organizing the code, we wouldn't be able to maintain the College Office software ourselves. Now that we have completed this task, the only way that we know to adequately disclose how our invention works is to include ALL our source code, comments, and other development tools. This information represents the crown jewels of Suvan LLC, and it all has been included in this patent disclosure in order to obtain a patent on our invention.

Perhaps at some future date it will be possible to link (or "bind") Microsoft Excel cells directly to fields in a database—that sort of ability would certainly have the potential to simplify all this work from a software developer's viewpoint. Another hurdle that we faced is Microsoft Excel does not let VBA code trap enough events. For example, the only Work-sheet-level events that VBA code can trap are: activate, beforedoublectick, beforerightclick, calculate, change, deactivate, followhyperlink, and selectionchange. Without an event that could trap a pending change, such as a beforechange event, we had to write code that was robust enough to deal with nonsensical changes that the user might make after the fact. For example, if the user entered values into areas of the worksheet that are not linked to the database, our code had to determine this fact, issue a beep, and restore the workbook back to its original condition. In summary, with the tools available today, constructing a workbook to database linkage requires lots and lots of detailed coding and computer instructions, all of which must be tested carefully and well commented.

How the Data Looks from the User's Perspective

The heart of this invention comes from the innovative ways that we linked a workbook to database tables in a transparent manner from the user's perspective. College Office provides a visual, highly interactive interface for using a workbook that is linked to database tables.

FIG. 4 shows a Totals page that acts like a table of contents or index to organize data in the workbook. In the preferred embodiment, the Totals page will be the left-most page in the workbook because users are likely to consider it the most important workbook page. Key features of FIG. 4 include:

46—a title bar that identifies which class is currently loaded in the workbook

48—a customized menu bar that lets the user give commands

50—item rows, zero or more item rows appear on the Totals and all Detail pages in the workbook; in this figure the items are students in a class.

52—page tabs; in College Office, the page tabs let the user jump rapidly from one workbook page to another.

54—toolbars are collections of buttons that let the user perform common tasks quickly.

55—total values are values that summarize other values on the page. For example, in College Office the Total column on the Totals page adds the points in all detail columns. In College Office the Total column on a Detail page adds the points in all subdetail columns. In other implementations of the invention, the total values might calculate the first, last, minimum, maximum, standard deviation, or other function of the columns that are being summarized. In College Office the user can enter a custom formula to override the usual calculation of total values.

56—detail columns, in this figure each detail column shows data about one activity in the class.

57—lookup values are values that have been returned after taking a total value and looking up its corresponding value in a table, array, range of cells, or other collection of memory locations. For example, in College Office a lookup value converts the number of points earned by a student into a grade (such as A, B, C, D or F). In other implementations a lookup value might convert:

income received by an employee into a withholding amount
 the diameter of a log into a board footage estimate, or
 the sales to a customer into a customer priority code.

In College Office, the user can enter a custom formula to override the usual way that a lookup value is calculated.

58—header rows, rows that identify the detail columns or provide summary statistics about the item rows 59—forced entry, a value or formula entered by the user into a total or grade column.

60—dual—purpose area. In one implementation or use of the invention, this area shows totals calculated from the detail pages in the workbook. Alternatively, in College Office the user can enter values directly into this area as well. Thus, in College Office the user has a choice about where to enter values. They can be entered on a detail page, and they will automatically appear on the Totals page, or they can be entered directly into the Totals page.

Figure 5:
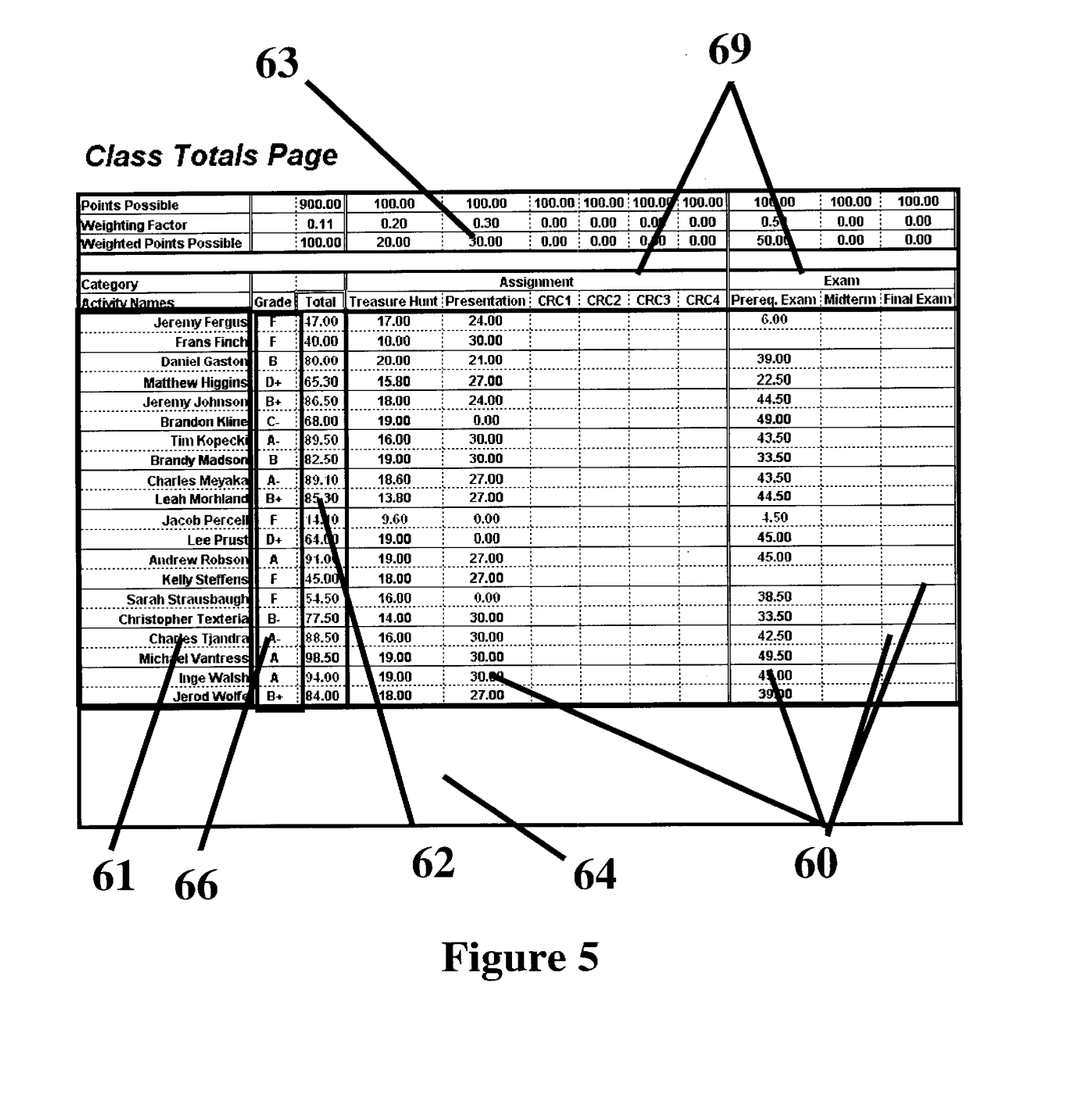
FIG. 5 shows a Totals page with labels to identify how portion of the page are linked to a database or other pages in the workbook.

FIG. 5 provides labels showing each logical area of the Totals page in FIG. 4. Heavy black borders have been drawn on top of the screen image to indicate each area of the Totals page. The number of rows in the Totals page depends primarily on how many (1) header rows, (2) items rows, and (3) footer rows that it contains. The header rows area, 63, provides summary statistics about the items in the page and display names for the columns. The item rows area, 61, lists each student, tree, customer, or other object that has been loaded from the database into the workbook. The footer rows area, 64, is optional and no footer rows appear in either FIGS. 4 or 5. The workbook totals area, 62, is optional and shows overall totals across the entire workbook. The lookup values area, 66, is optional, and in the College Office gradebook implementation of this invention, the lookup values area is used to show each student's overall grade in the course. In other implementations, the workbook totals area might show the total sales made to each customer, the total growth in each tree in a test plot, or the date of the first sale made to each customer. In the preferred embodiment, the left-hand portion of the screen is frozen in place so that the user can conveniently scroll the Detail columns left and right without having the labels in the first few columns disappear from view.

Figure 6:
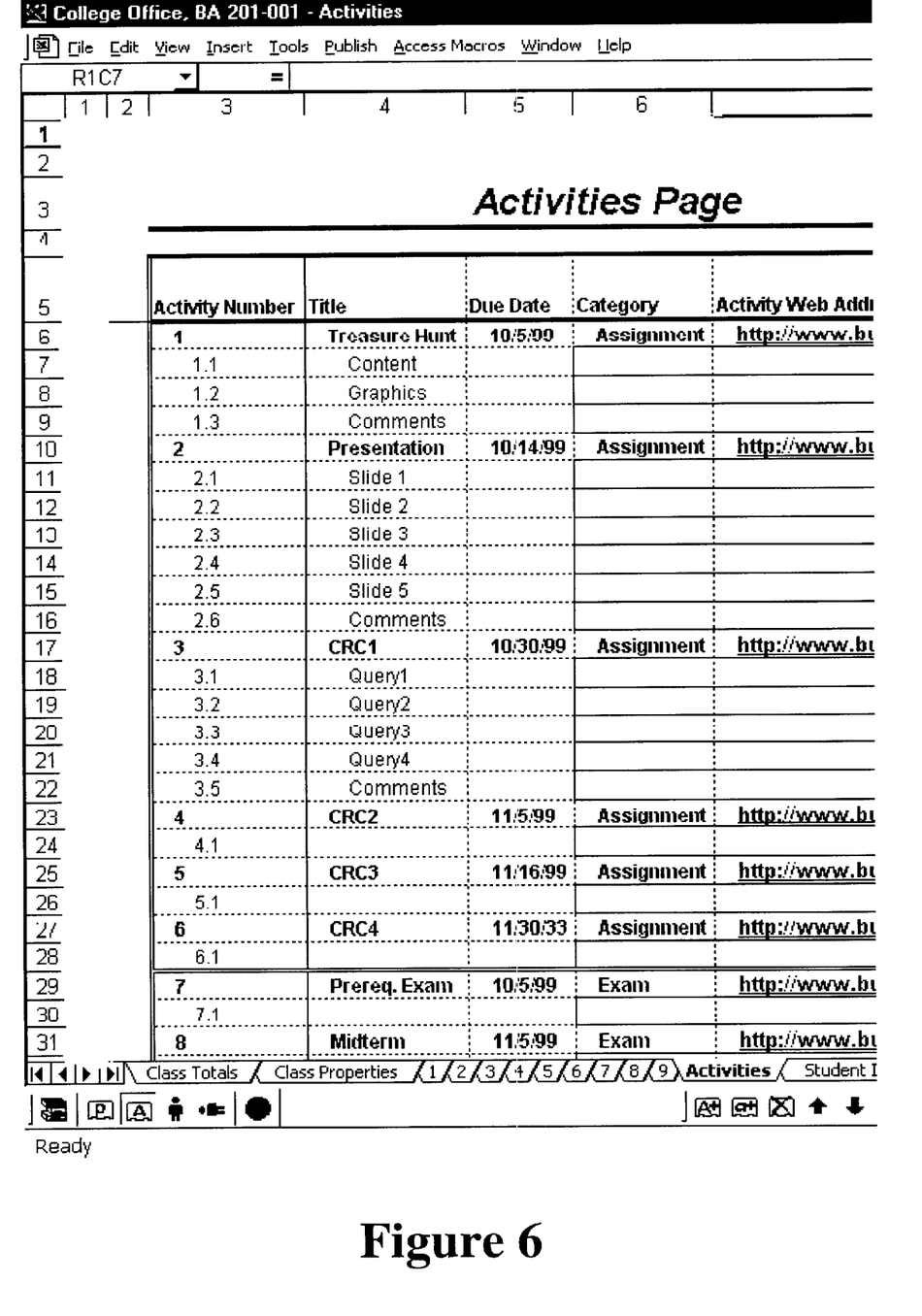
FIG. 6 shows the Activities page that lists all Activity pages College Office gradebook.

FIG. 6 shows an Activities page that the user can use to:
 review or edit information about what Activity pages are in the workbook,
 create new Activity pages or delete existing Activity pages,
 rearrange the order of Activity pages,
 create new Categories or delete existing Categories, or
 move Activity pages from one Category to another.

The information in FIG. 6 comes from the same workbook that was used to create FIGS. 5 and 7.

FIG. 7 shows each logical area in a Detail page. (Remember that within College Office, a Detail page is called an Activity page). The header rows area (83), item rows area (81), and lookup values area (86) in FIG. 7 perform corresponding functions to the header rows area (63) and item rows area (61) and lookup values area (66) in FIG. 5. The area with subdetail columns (84) gets summarized in the area for showing totals of the subdetail columns (82). Notice that values in the Totals column in FIG. 7 are the same as the values in the corresponding detail column in FIG. 5. Thus, the 17 points shown for Jeremy Fergus in FIG. 7 is identical to the value for Jeremy Fergus in the Treasure Hunt column of FIG. 5. Values entered by the user on a Detail page will automatically be posted back to the database and will normally affect the relevant column of the Totals page.

In the preferred embodiment shown in FIGS. 4 through 7, the Totals page has only one column for each Detail page, and that column simply displays the value from the Total column in the relevant Detail page.

Figure 8A:
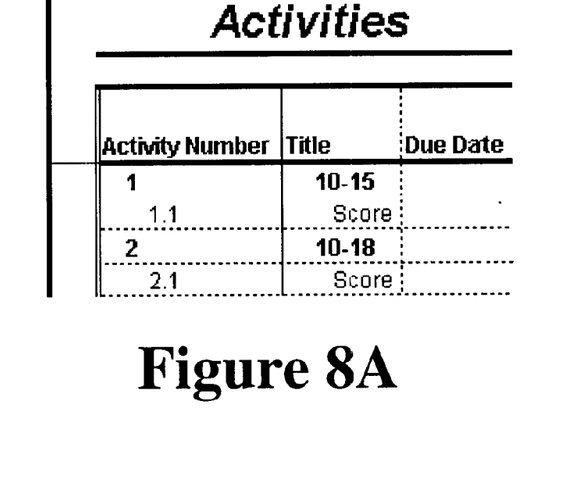
FIG. 8 shows the relationships among the Activities page, Totals page, and Detail pages in a course with many activities and few subactivities. Part A: Each item entered on the Activities page was made into a new activity. Part B: The Main page has lots of columns, one for each activity. Part C: Each activity page has only one column to enter scores.
Figure 8B:
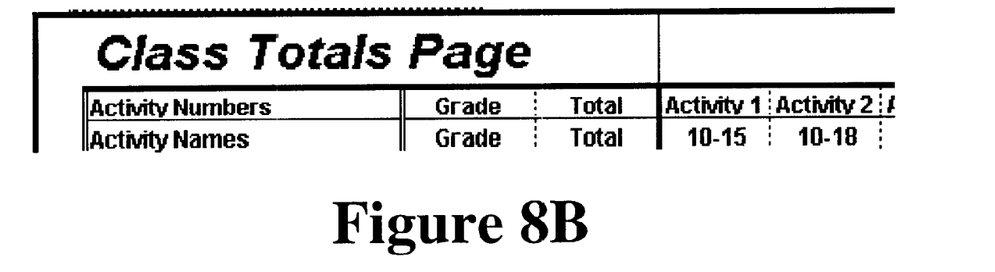
Figure 8C:
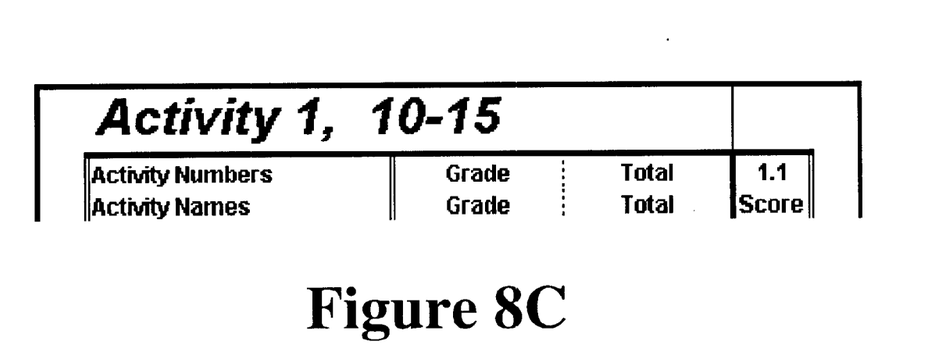

The three parts of FIG. 8 perform a similar function to FIGS. 5, 6, and 7: they show how columns on the Totals page are related to Detail pages. Another way to look at FIG. 8 is to notice that it describes a course with many activities and few subactivities. In part A, each item entered on the Activities page was made into a new activity. In part B, the Totals page has lots of columns, one for each activity. In part C, each Activity page has only one column to enter scores.

Conclusion and Scope

Accordingly, the reader will see that by automatically linking a workbook to a database as described in this patent disclosure, the computer user reaps the best features of both spreadsheets and databases for entering and analyzing data.

Although the description above contains many specificities, these should not be construed as limiting the scope of the invention but as merely providing illustrations of some of the presently preferred embodiments of this invention. For example, the method might be implemented on a computer running an operating system built by some other company than Microsoft; the Item rows might store other items than student names; the Totals page might have more than one column for each Detail page; and so on.

This invention does not require the spreadsheet and database to be separate products; as software continues to evolve both these software products may be bundled or merged together, but a method of linking workbooks and database tables, such as the method described in this invention, will still be required even if the two software products merge.

Additionally, the invention's instructions do not need to be stored in a workbook as they are in the College Office product; instead, they might be stored in a template (such as a Microsoft Excel XLA file), in the spreadsheet program (such as Microsoft Excel itself), in the database (such as Microsoft Acess or a Microsoft Access MDB file), or in separate files, such as DLL (dynamic linked libraries) or EXE (executable) files.

Thus the scope of the invention should be determined by the appended claims and their legal equivalents, rather than by the examples given.

What is claimed is:

1. In a computer system having a workbook and a database, an improved method for using said workbook comprising:

(a) providing Detail pages in said workbook where the number of Detail pages can be determined by examining the contents of said database;

(b) providing a Totals page that has detail columns (56) to present information that summarizes data in said workbook's Detail pages;

(c) displaying Item rows (50) on all said Totals and Detail pages;

(d) receiving as input from a user an entry to a cell on one of said Detail pages;

(e) in response to step (d), recalculating the values of said detail column(s) of said Totals page, and updating said database to reflect the user's entry.

(f) receiving as input from a user a double-click on an Item row (50) in one of said detail columns (56) in said Totals page;

(g) in response to step 1(f), displaying the Detail page associated with said detail column.

2. In a computer system having a workbook and a database, an improved method for using said workbook comprising:

(a) providing a worksheet with detail columns (60);

(b) providing a total values (55) column on said worksheet that adds values in said detail columns;

(c) displaying Item rows (50) on said worksheet where the number of Item rows displayed in said workbook can be determined by examining the contents of said database;

(d) means, responsive to user input consisting of a double-click on a detail column in the Totals page, for displaying the Detail page associated with said detail column in such a manner as to obscure at least a portion of said Totals page.

* * * * *